United States Patent [19]
D'Agnolo et al.

[11] 3,980,175
[45] Sept. 14, 1976

[54] DEVICE FOR ALIGNING COPS WHICH WITHDRAWS THEM IN BULK

[75] Inventors: Armando D'Agnolo; Giovanni Favero, both of Pordenone, Italy

[73] Assignee: Officine Savio, S.p.A., Pordenone, Italy

[22] Filed: Apr. 30, 1974

[21] Appl. No.: 465,581

[30] Foreign Application Priority Data
May 3, 1973  Italy ................................ 83362/73

[52] U.S. Cl. ........................... 198/410; 198/524; 221/248; 221/254
[51] Int. Cl.[2] ........................................ B65G 47/14
[58] Field of Search ................. 198/45, 55, 57, 58, 198/23, 24, 26, 198, 199, 287, 30; 221/271, 276, 247, 248, 253, 254

[56] References Cited
UNITED STATES PATENTS

| | | | |
|---|---|---|---|
| 2,502,779 | 4/1950 | Coons | 198/55 X |
| 2,656,235 | 10/1953 | SeBastian | 221/247 X |
| 2,711,245 | 6/1955 | Taylor | 198/24 |
| 2,930,473 | 3/1960 | Campbell | 198/287 X |
| 2,966,250 | 12/1960 | Robock | 198/30 |
| 2,966,253 | 12/1960 | Gerrans | 198/37 |
| 3,089,297 | 5/1963 | Craig et al. | 198/24 X |
| 3,321,064 | 5/1967 | Sanders et al. | 198/45 |
| 3,326,351 | 6/1967 | Ross et al. | 198/54 X |
| 3,367,534 | 2/1968 | Carter | 198/55 X |
| 3,442,200 | 5/1969 | Babel | 221/248 X |
| 3,506,106 | 4/1970 | Brouwer et al. | 198/287 |
| 3,690,511 | 9/1972 | Wigham | 221/253 X |
| 3,699,833 | 4/1971 | Stoppard | 198/287 X |
| 3,713,465 | 1/1973 | van Nobelen | 198/57 X |
| 3,748,759 | 7/1973 | Liess | 198/198 X |
| 3,777,932 | 12/1973 | Matsui et al. | 221/253 X |
| 3,809,213 | 5/1974 | Savio | 198/287 X |

*Primary Examiner*—Evon C. Blunk
*Assistant Examiner*—Richard K. Thomson
*Attorney, Agent, or Firm*—Stevens, Davis, Miller & Mosher

[57] ABSTRACT

A device for aligning cops which withdraws them in bulk from a storage bin consisting of a substantially horizontal conveyor belt which discharges the cops onto a second elevating conveyor belt, which acts as a first spacing means. After the second elevating conveyor belt, the cops are further spaced out by two conveyor belts and are delivered one at a time along their axis into a collection chamber, from which they reach the usage means by passing over a sloped collection surface.

14 Claims, 5 Drawing Figures

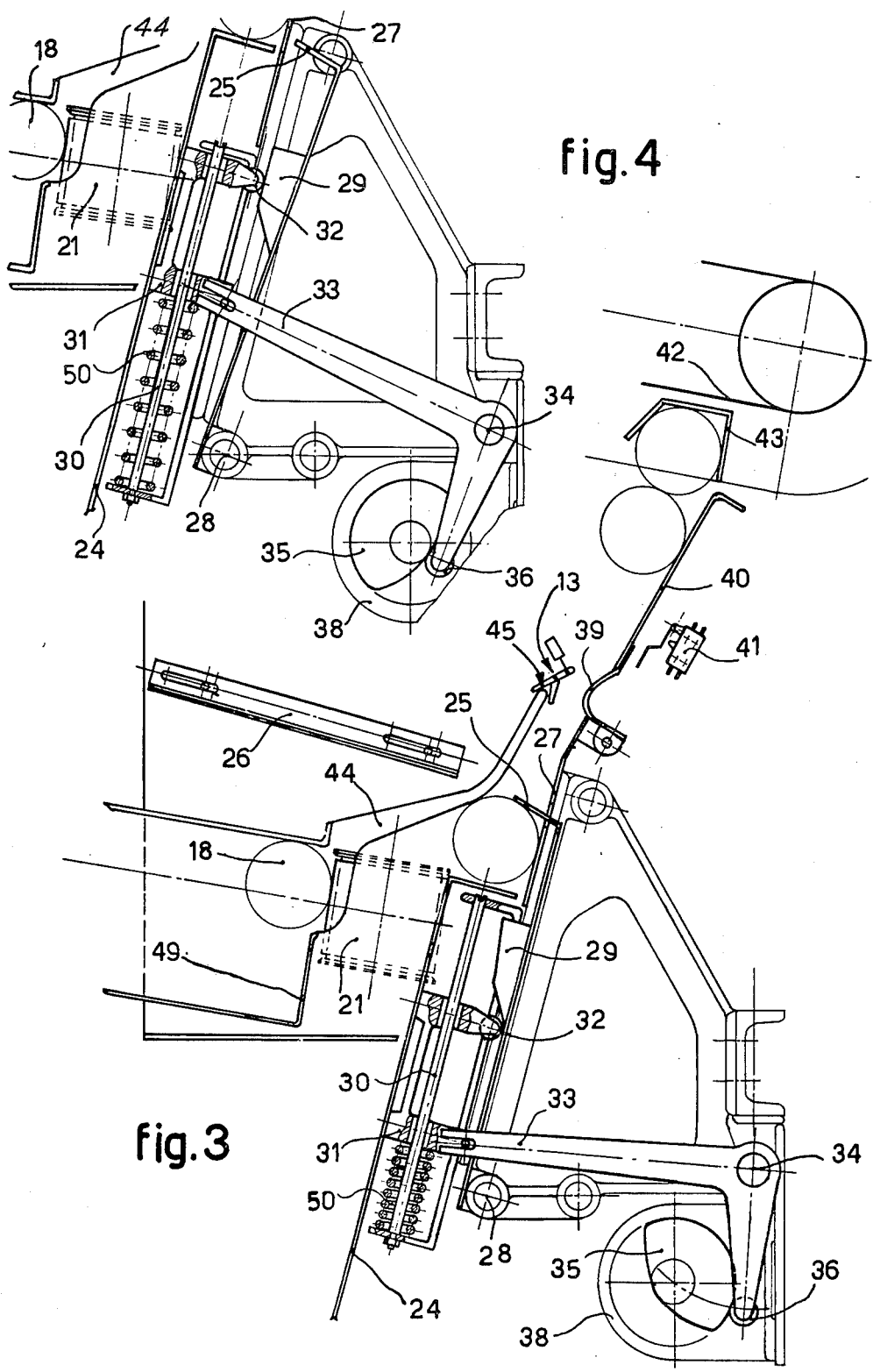

DEVICE FOR ALIGNING COPS WHICH WITHDRAWS THEM IN BULK

The present invention relates to a device for aligning cops which withdraws them in bulk. More particularly, the device serves to withdraw cops from a container, where they lie in bulk, and to despatch them in parallel rows to some usage means which may, for example, consist of automatic machines for processing yarn or of elevators.

A device is known which consists, for example, of a slatted conveyor, which withdraws cops in bulk essentially from the bottom of a container and makes them drop onto a belt. The belt aligns them and then transfers them onto one or more belts positioned side by side, which discharge the cops into a storage bin having a sloped bottom from which a conveyor with hooks withdraws them.

The present invention, therefore, has for an object a device for presenting cops, properly oriented and aligned on a single plane, to an elevator of any desired type and usage by withdrawing said cops from a formless renewable stock.

This is achieved by contributing improvements to the initial idea and by realizing noteworthy new useful features.

The first useful feature is provided by the fact that the cops are loaded in bulk and are removed from the loading area as required.

A second useful feature is provided by the fact that the heap of cops in bulk in contact with the removal belt are not mixed up, while the cops in contact with the elevating belt are scarcely mixed up and have not gotten a large number of cops lying on top of them. In this way the yarn wound onto them does not become loosened or slackened.

Furthermore, the elevating means has at its loading point a means for limiting loading and it is possible thereby to restrict the number of cops unloaded onto said elevating means. The elevating belt also has a series of reduction protrusions to carry out a further spacing of the cops and a progression of discharge.

A further useful feature is the fact that the cops falling from the elevating belt and travelling on the collection belt predispose themselves in correct alignment with and in proper succession along the direction of forward movement of said collection belt.

Yet another useful feature is the fact that the cops falling onto the exit belt are further spaced out and separated from each other.

Again, the cops delivered to the intermediate storage bin are despatched to the usage storage point one at a time in such a way that they are aligned and parallel and are not one on top of another.

The main object, together with other objects and useful features beside those listed, as will become clearer hereinafter from the description, are thus achieved by a device for aligning cops which withdraws them in bulk and includes in combination:

a first removal conveyor belt, which is substantially horizontal and discharges onto a second elevating conveyor belt, which is substantially sloped upwards in the direction of forward movement and which bears some transverse, sloped, staggered protrusions, a third collection conveyor belt, which is substantially horizontal and is placed across and below the discharging edge of said second elevating conveyor belt, a fourth exit conveyor belt, which is substantially horizontal and lies below said third collection conveyor belt and is parallel to it and vertically staggered therefrom;

a connecting conveyor means, which is vertically sloped and connects the entry point of said horizontal exit conveyor belt to the exit point of said collection conveyor belt;

a collection chamber positioned at the exit from said horizontal exit conveyor belt, said chamber having a means for limiting departure and a lower movable surface, and a sloped collection surface with a means for limiting loading.

A preferred non-limiting form of the present invention will be described with reference to the accompanying drawings in which:

FIG. 1 gives a view of a device in accordance with the invention in longitudinal, vertical section;

FIG. 2 gives an axonometric view of the conveyor belts adapted in the device of FIG. 1;

FIG. 3 gives a view in section of the collection chamber and of the collection surface;

FIG. 4 shows a part of FIG. 3 with the lower movable surface displaced; and

Figure 1:
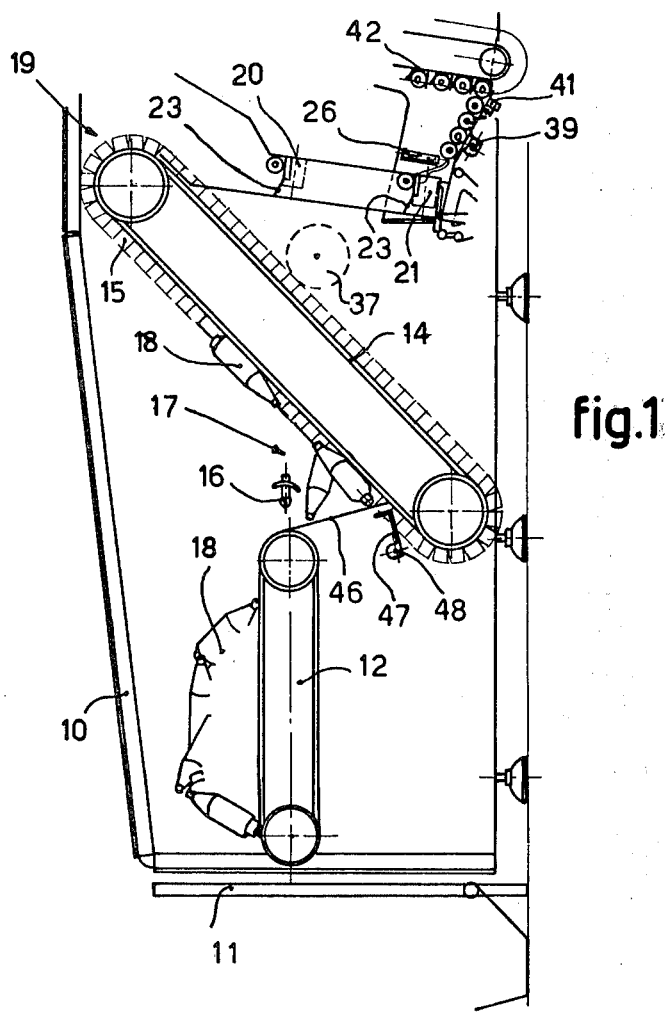

In FIG. 1, within a lateral containing framework 10, which has at its end a lift truck 11 of a type that is known and is therefore not specifically shown and described, a horizontal or almost horizontal removal belt 12 receives the cops 18 in a heap and in bulk. In proportion to demand, the removal belt 12 discharges cops 18 in controlled numbers onto an upwardly sloped elevator belt 14, which has some transverse projections 15. In a preferred position below the elevator belt 14 it is possible to arrange a rotating roller 37, which is produced with radial bristles and serves to clean from the belt 14 any threads deposited thereon.

The delivery of cops 18 onto the belt 14 is governed by the means for limiting quantity 16, which, when the stock 17 created by cops 18 falling onto the elevator belt 14 rises above the line of sight of the control means 16 present on both sides of the belt 14, affects the forward movement of the belt 12 and stops it, only reactivating it thereafter when said line of sight is definitely freed again.

This line of sight may, for example, be produced with a source of light which acts on a photoelectric detector.

Figure 2:
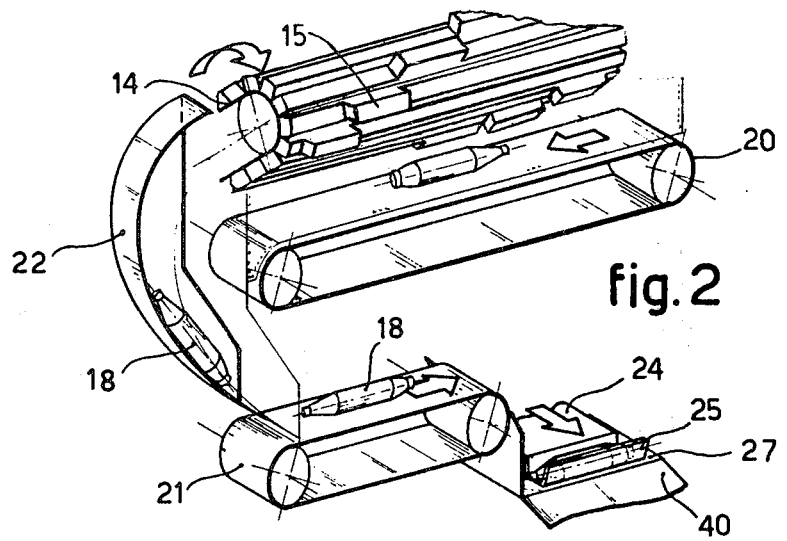

In the case of a slatted elevator belt 14, the transverse projections (seen in detail in FIG. 2) are positioned in steps, and when one series of transverse projections arrives at one edge, another series starts correspondingly at the other edge. Where, however, the belt 14 is of a fabric or rubberized type, the projections 15 may be sloped and continuous.

In accordance with the present invention, the minimum distance between one series of projections 15 and the next must be greater than the length of the cops so as to obtain the desired predisposing action.

The storage point 17 is bounded on its lower side by the belt 14 and at its forward end by the chute 46. However, since the projections 15 are present on the belt 14, the chute can not come into contact with the surface of the belt 14. This could cause faults owing to parts of the cops 18 becoming wedged between the edge of the chute 46 and the belt. To prevent this, striker means 47 have been arranged, which pivot freely at 48 and are activated by the projections themselves 15 and which shut off part of the gap between the chute 46 and the belt 14 at moments when no projections 15 are present.

Owing to the presence of the projections 15 and in correspondence with the disposition thereof, the cops 18 tend to arrive at the edge 19 of the belt 14 in an already orderly manner, one after another, along the steps formed by the projections 15. Below the edge 19 there is a transverse horizontal collection belt 20, which has its transporting surface sloped. Below the belt 20 there is a second exit conveyor belt 21, which is also horizontal and has its surface sloped. The two belts are staggered as regards a vertical plane in the direction of the slope of their upper transporting surfaces. Between the two belts there is a vertical conveyor or sloped chute 22, which receives cops 18 oriented in one direction from the belt 20 and discharges them, turned round, onto the belt 21. The chute 22 is sloped in such a way as to connect the two belts 20 and 21. Where the two belts 20 and 21 are positioned side by side, instead of the chute 22 there could be a transverse switching means, which could either make a cop turn about or could only move it onto the other belt.

The sloping of the upper surface of the conveyor belts 20 and 21 facilitates both the functioning of the conveyor 22, which also is sloped, and the alignment and spacing of the cops. As regards the spacing, this is also accentuated by at least two other factors. The first factor lies in the fact that each belt 20 and 21 has on its upper surface an auxiliary chute 23, which is sloped at an angle to the belt. This auxiliary chute 23 covers the belt in such a way as to leave free in a crosswise direction only a certain section thereof and thus allows only one cop 18 at a time to be in contact with the belt in a direction across the belt itself.

A second factor lies in the fact that the removal speeds of the belts 20 and 21 are different, the belt 21 moving faster. Spacing is then further improved by the fact that at the exits from the belts 20 and 21 there is a limiting means 49, which shuts off part of the exit from the belts and allows only one cop to come out at a time. At the exit from the exit belt 21 (see FIGS. 2 and 3) one finds a sloped collection chamber, which has a movable sliding means 24 on its lower surface, and a fixed part 27 with an angled displaceable means 25, which restricts exit, and an adjustable upper means 26 for restricting exit. The adjustment arranged in the upper means 26 for restricting exit serves to regulate the transiting space between 26 and 27 to suit the diameter of the cops 18. The first cop 18 to arrive in the collection chamber halts between the means 25 for restricting exit and the movable sliding means 24 (see the examples of FIGS. 2 and 3) because the upper restricting means 26 and the tongue of the displaceable restricting means 25 do not allow it to come out. The succeeding cops are deposited in one or more layers above the first cop 18 and above the movable sliding means 24. The displaceable restricting means 25 is hinged at 28 and bears a cam 29. The restricting means is kept elastically pressed upwards by a spring (not shown here), which could be coiled around the shaft 28, for exammple. The movable sliding means 24 runs on the guides 30 and is sustained by the support 31. The support 31 carries at least one roller 32, which is enabled to act against the cam 29. The cam 29 is shaped in such a way as to prevent the movement of displacement of the restricting means 25 and the movement of the sliding means 24 from creating pressure on the cop 18, which is also accompanied by the edge of the restricting means 25 in its forward movement, which has been induced by the movable sliding means 24. The movable sliding means 24 is elastically pressed towards the restricting means 25 by a spring 50, and its positioning depends on the arm 33, as shall be seen later. Activation of the movable sliding means 24 is produced by the arm 33, which is hinged at 34 and is activated by the cam 35, which presses on the small roller 36 of the same arm. The cam 35 is activated by a motor means 38, which is governed by the presence or absence of cops on the controlling means 39 placed in the sloped collection surface 40. When a cop is present, the controlling means 39 activates the switch 41, which in turn governs the motor 38. As long as a cop is not positioned stably on the controlling means 39 but is only transiting thereover, the motor 38 goes on working and the movable sliding means 24 continues moving backwards and forwards, thus freeing the passage (see FIG. 4) for any cop 18 which may be present by means of the small roller 32 acting on the cam 29. During its phase of backward movement the sliding means 24 loads another cop 18 and thereafter repeats the cycle that has been described. When the stock of cops building up on the surface 40 begins to touch the controlling means 39 in a stable manner, the motor 38 halts in the position of FIG. 3, and everything remains positioned as shown in FIG. 3 except for 39 and 41, which are affected by one or more cops. When the loader 42 takes cops from the surface 40 with its compartments 43 and thus frees the controlling means 39, the motor 38 starts working again until the stock of cops has again been built up to the height of the controlling means 39. At the exit from the belt 21 there could be arranged a suction opening 44, functioning to retain any flying threads existing on the cops. The thread is thus conveyed to the end of the opening 44 at 45, where continuously operating shears 13 of a known type cut off the excess and leave the end almost aligned along the cop 18, which takes it on with itself.

Figure 5:
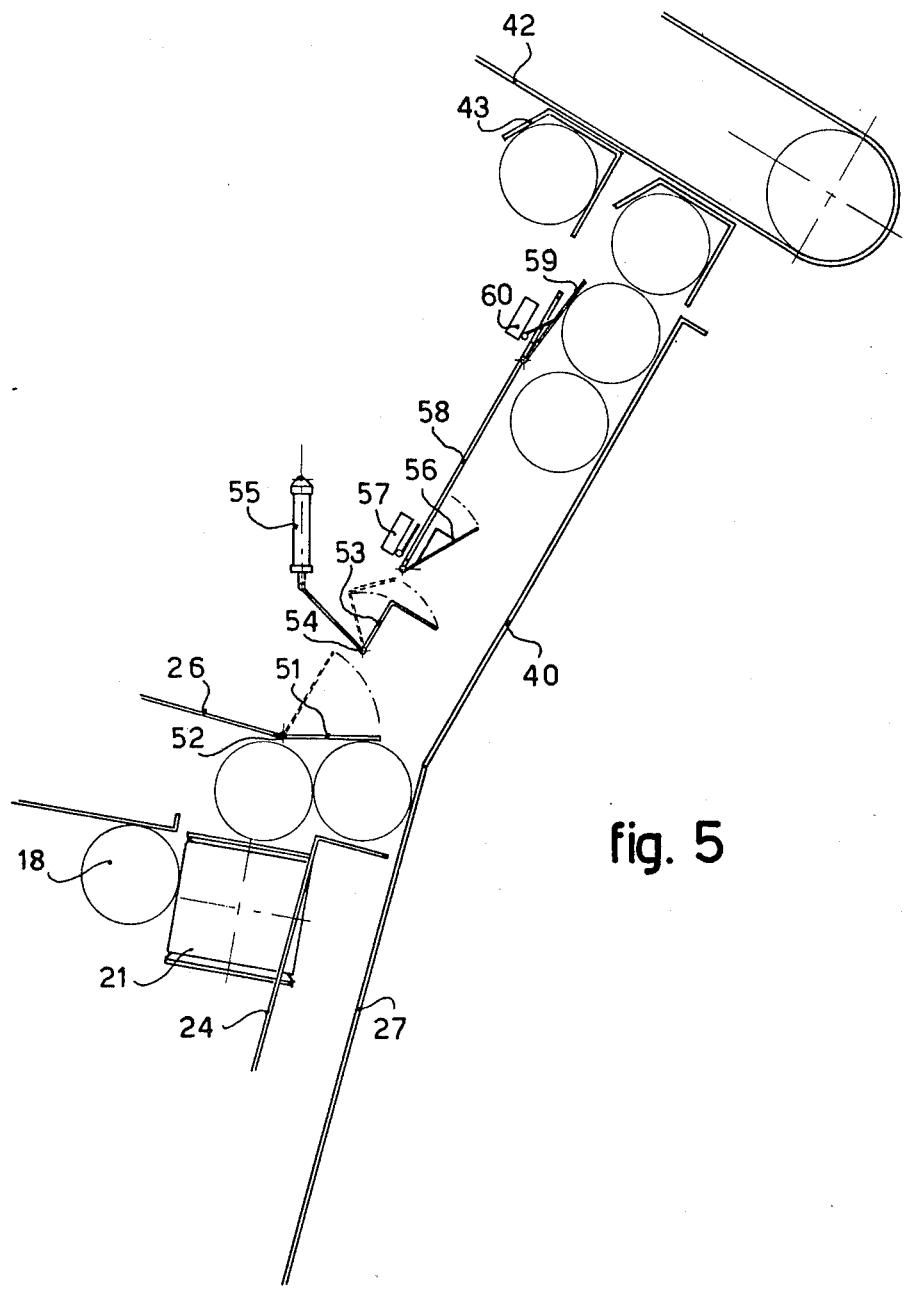
FIG. 5 shows a variant from the layout shown in FIG. 3.

In accordance with a further embodiment in FIG. 5 one has the restricting means 26, still adjustable as regards its height, having a section 51 which pivots and is hinged at 52. Immediately downstream therefrom there is a withholding means 53, hinged at 54 and capable of being activated by a piston 55. The withholding means 53 also may be arranged to be displaceable downwards and not necessarily upwards. When the cop 18 has fallen between the sliding means 24 and the pivoting angled means 51, it is thrust by the sliding means 24 out of the detaining point of the angled means 51 and is then caused to roll along the sloped surface 40. The withholding means 53 performs the function of halting the cop 18 for a moment and of perhaps straightening it and thereafter releasing it by raising and lowering itself. The action of the withholding means 53 causes the cops 18 to descend in a parallel manner and to be certainly positioned in alignment with each other and not crosswise to each other.

After passing the withholding means 53, the cop activates a detector 56 which governs a micro-switch 57. The detector 56 performs the same function as the previous detector 39 even though it is activated in a different way. After passing the detector 56, the cop 18 proceeds to position itself between the chute 40 and the screen 58, the latter being slightly raised to a height a little greater than the diameter of a cop. The screen 58 prevents the cops 18 from being able to be astride each other for any reason and thus prevents them from being positioned in an imperfect manner before the elevator 42. At the end of the screen 58, there is a feeler means 59, which governs a micro-switch 60. The feeler means 59 serves to avoid the position that a cop running down along the surface 40 should have to enter the compartments 43 of the elevator at once. In fact, if the feeler means 59 detects that there is no cop 18 ready to enter the next compartment 43, the microswitch 60 halts the elevator 42 until minimum stock is built up again. This makes it possible to avoid rebounding or false or wrong locating of a cop 18 in the compartments 43 of the loader 42.

A preferred realization of the present invention has been described. However, diverse variations are possible by an expert in this field and still be within the scope and intent of the inventive idea. In particular the shapes and proportions shown could be changed, as also could some preferred resolutive forms which have been given for exemplificative purposes.

Thus the slatted belts 12–14 could be replaced with continuous belts. The roller 37 could be omitted or applied in a different position from that shown in FIG. 1. Where the two belts 20 and 21 are side by side, the vertical chute 22 could be replaced by a transverse connecting belt with angled deflectors to accentuate the turnabout of the cop 18. The lever 33 could have a secondary lever to adjust the free dropping space before the sliding means 24 to suit the diameter of a cop. The cam 35 could guide the roller 36 in a slot, thus making the spring 50 unnecessary. The feeler means 39 could be placed above instead of below surface 40. The withholding means 53 could be displaced downwards instead of upwards. The feeler means 59 could be placed below or be replaced by a light-sensitive detector or another detector suitable for the purpose. The screen 58 could have a stretch running parallel to the elevator 42. The loader 11 could be omitted or be of any known type.

What is claimed is:

1. A device for aligning cops which withdraws them in bulk comprising a substantially horizontal first removal conveyor belt, an upwardly sloped second elevator conveyor belt bearing a plurality of series of staggered projections which receives the discharge from said first belt, an intermediate storage point between said removal conveyor and said sloped second elevator conveyor, a substantially horizontal third collection conveyor belt positioned across and below the unloading edge of said second elevator conveyor belt, a substantially horizontal fourth exit conveyor belt positioned below said third collection conveyor belt being parallel thereto and vertically staggered therefrom, a vertically sloped connecting conveyor which joins the entrance of said horizontal exit conveyor belt to the exit from said collection conveyor belt, a collection chamber positioned at the exit from said horizontal exit conveyor belt, said collection chamber having a means for restricting the exiting of cops and a lower movable surface, and a sloped collection surface with a means for restricting the entry of said cops onto said collection surface, which means governs the functioning of the movable surface.

2. The device of claim 1 for aligning cops, in which each series of projections on the elevator conveyor belt are made parallel in elevation, the beginning of one projection coinciding transversely with the end of the previous projection, each series of projections positioned, longitudinally of the belt a distance from the next succeeding series greater than the length of a cop.

3. The device of claim 1 for aligning cops, in which the collection chamber at the exit from the exit conveyor belt has in cooperation and in reciprocal combination a lower sloped surface, a movable sliding means, an upper adjustable vertical means for restricting exit and a lower displaceable restricting means.

4. The device of claim 3 for aligning cops in which between the movable sliding means in its backwards position and the lower displaceable restricting means only one cop can lie, the displacement of the lower restricting means being coordinated with the forward movement of the sliding means.

5. The device of claim 1 for aligning cops, in which the collection chamber at the exit from the exit conveyor belt has in cooperation and in reciprocal combination a lower sloped surface, a movable sliding means, an upper vertical means for restricting exit with a lower pivoting element and a displaceable retaining means positioned downstream from the restricting means, the displacement of the retaining means being coordinated with the forward movement of the movable sliding means.

6. The device of claim 1 in which the sloped collection surface has in combination a means for restricting loading, an upper screen and a feeler means for verifying the presence of cops, wherein the means for restricting loading governs the functioning of the movable surface and the feeler means governs a loader, the feeler means for verifying the presence of cops being close to the passage of compartments of a loader.

7. A device for aligning cops which withdraws them in bulk comprising a substantially horizontal first removal conveyor belt, an upwardly sloped second elevator conveyor belt bearing a plurality of series of staggered projections which receives the discharge from said first belt, an intermediate storage point between said removal conveyor and said sloped second elevator conveyor, a retaining chute between the removal conveyor belt and that part of the elevator conveyor belt which is positioned below said removal conveyor belt, a plurality of striker means, which pivot between the lower edge of the chute and the surface of the elevator conveyor belt and which cooperate with said chute in the retaining action, a substantially horizontal third collection conveyor belt positioned across and below the unloading edge of said second elevator conveyor belt, a substantially horizontal fourth exit conveyor belt positioned below said third collection conveyor belt being parallel thereto and vertically staggered therefrom, a vertically sloped connecting conveyor which joins the entrance of said horizontal exit conveyor belt to the exit from said collection conveyor belt, a collection chamber positioned at the exit from said horizontal exit conveyor belt, said collection chamber having a means for restricting the exiting of cops and a lower movable surface, and a sloped collection surface with a means for restricting the entry of said cops onto said collection surface.

8. The device of claim 5 for aligning cops, in which the elevator conveyor belt has a cleaning roller in a position below itself.

9. The device of claim 7 for aligning cops, including detector means for scanning the intermediate storage point said detector being positioned transversely to and above the elevator conveyor belt and close to the removal conveyor belt, which is governed by said detector means.

10. The device of claim 7 for aligning cops, in which the horizontal collection conveyor belt and the horizontal exit conveyor belt have their upper surface sloped, there being a side wall for retaining cops on the lower side of the transverse slope of said belts.

11. The device of claim 7 for aligning cops, in which the collection conveyor belt and the exit conveyor belt are transversely sloped and have a sloped chute which shuts off part of the width of the belts, an amount of the width of the belts approximate to the diameter of a cop being left uncovered, the sloped chute being present on the higher part of the slope of the belts.

12. The device of claim 7 for aligning cops, in which at least the exit conveyor belt has a means for limiting exit by shutting off part of the width of the exit from the belt.

13. The device of claim 7 for aligning cops, in which the collection and exit conveyor belts have travelling speeds which are progressive in the direction of the sequence of said conveyor belts.

14. The device of claim 7 for aligning cops, including at the exit from the exit conveyor belt a conveying suction opening with some continuous shears at the end position thereof.

* * * * *